US012105453B2

(12) United States Patent
Yamada et al.

(10) Patent No.: US 12,105,453 B2
(45) Date of Patent: Oct. 1, 2024

(54) FIXING DEVICE AND IMAGE FORMING APPARATUS

(71) Applicant: FUJIFILM Business Innovation Corp., Tokyo (JP)

(72) Inventors: Kosuke Yamada, Kanagawa (JP); Tetsuro Kodera, Kanagawa (JP); Yoshiki Shimodaira, Kanagawa (JP); Masato Yamashita, Kanagawa (JP); Mitsuhiro Matsumoto, Kanagawa (JP); Takayuki Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/716,521

(22) Filed: Apr. 8, 2022

(65) Prior Publication Data

US 2023/0161283 A1 May 25, 2023

(30) Foreign Application Priority Data

Nov. 25, 2021 (JP) ................................ 2021-191420

(51) Int. Cl.
*G03G 15/20* (2006.01)

(52) U.S. Cl.
CPC ................................ *G03G 15/2053* (2013.01)

(58) Field of Classification Search
CPC ........... G03G 15/1605; G03G 15/2007; G03G 15/205; B41J 11/00216
See application file for complete search history.

(56) References Cited

U.S. PATENT DOCUMENTS

| | | | | | |
|---|---|---|---|---|---|
| 4,377,333 | A * | 3/1983 | Tsuji | G03G 15/6529 399/317 |
| 2015/0275022 | A1* | 10/2015 | Chen | C09D 127/14 524/544 |
| 2015/0378301 | A1* | 12/2015 | Nakamura | B65H 29/041 399/21 |
| 2016/0070212 | A1* | 3/2016 | Kamoda | G03G 15/2021 399/336 |
| 2019/0171135 | A1* | 6/2019 | Ota | G03G 15/205 |
| 2019/0299584 | A1* | 10/2019 | Tzomik | B32B 37/30 |

FOREIGN PATENT DOCUMENTS

| | | | | |
|---|---|---|---|---|
| EP | 2613204 | A1 * | 7/2013 | G03G 15/2028 |
| JP | 2002-148973 | A | 5/2002 | |
| JP | 5217634 | B2 * | 6/2013 | |
| WO | WO-2021005929 | A1 * | 1/2021 | G03G 15/2007 |

OTHER PUBLICATIONS

Extended European Search Report dated Dec. 13, 2022, issued in European Application No. 22176607.4.
Examination Report issued Aug. 18, 2023 in Australian Application No. 2022203794.

* cited by examiner

*Primary Examiner* — Jessica L Eley
(74) *Attorney, Agent, or Firm* — Sughrue Mion, PLLC

(57) ABSTRACT

A fixing device includes: a holding part that extends in a width direction of a recording medium being transported and that holds the recording medium; a pair of circulating parts that are attached to both ends of the holding part and that circulate to transport the recording medium; and a heating member that heats the recording medium in a non-contact manner and that is located in a space between the pair of circulating parts in the width direction.

8 Claims, 12 Drawing Sheets

FIXING DEVICE AND IMAGE FORMING APPARATUS

CROSS-REFERENCE TO RELATED APPLICATIONS

This application is based on and claims priority under 35 USC 119 from Japanese Patent Application No. 2021-191420 filed Nov. 25, 2021.

BACKGROUND

(i) Technical Field

The present disclosure relates to a fixing device and an image forming apparatus.

(ii) Related Art

Japanese Unexamined Patent Application Publication No. 2002-148973 discloses an image forming apparatus in which the distance between a transport member, which is made of endless wires, and a transport auxiliary member is smaller at an outlet of a transfer material than at an inlet of the transfer material. By rotating transport pulleys with a rotational driving source, the transport member and the transport auxiliary member are driven to transport the transfer material, an unfixed toner image is heat-fused by radiant heat, and the transfer material is transported to a guide member at the inlet of a calender roller.

A known image forming apparatus includes: a pair of endless circulating parts disposed on both sides of a recording medium being transported, in the width direction of the recording medium; and holding parts extending in the width direction of the recording medium, attached to the pair of circulating parts at both ends thereof, and configured to hold the leading end of a recording medium. The pair of circulating parts transport the recording medium. Furthermore, to heat, in a non-contact manner, the recording medium being transported, a heating part, such as a heater, is disposed so as to oppose the recording medium being transported.

With this configuration, because the heating part and the circulating parts overlap each other in the width direction of the recording medium, the circulating parts are heated by the heating part, and the temperature of the circulating parts increase.

SUMMARY

Aspects of non-limiting embodiments of the present disclosure relate to preventing the circulating parts from being heated by the heating part, compared with a configuration in which the heating part and the circulating parts overlap each other in the width direction of the recording medium.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fixing device including: a holding part that extends in a width direction of a recording medium being transported and that holds the recording medium; a pair of circulating parts that are attached to both ends of the holding part and that circulate to transport the recording medium; and a heating member that heats the recording medium in a non-contact manner and that is located in a space between the pair of circulating parts in the width direction.

BRIEF DESCRIPTION OF THE DRAWINGS

Exemplary embodiments of the present disclosure will be described in detail based on the following figures, wherein.

DETAILED DESCRIPTION

First Exemplary Embodiment

An example of a fixing device and an example of an image forming apparatus according to a first exemplary embodiment of the present disclosure will be described below with reference to FIGS. 1 to 10. Note that, in the figures, arrow H represents the top-bottom direction of the apparatus (vertical direction), arrow W represents the width direction of the apparatus (horizontal direction), and arrow D represents the depth direction of the apparatus (horizontal direction).

Image Forming Apparatus

Figure 9:
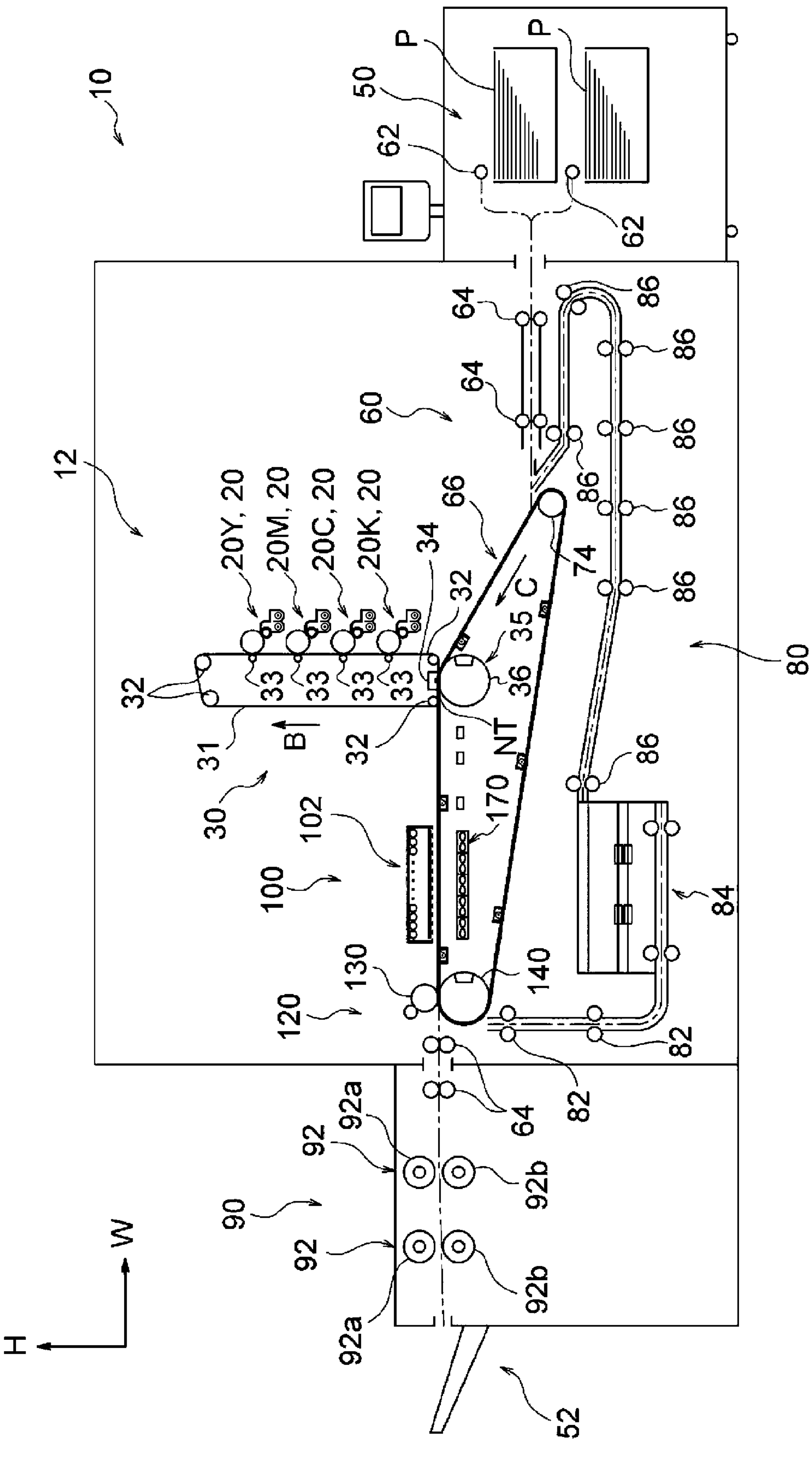
FIG. 9 shows a configuration of the image forming apparatus according to the first exemplary embodiment of the present disclosure.

An image forming apparatus 10 according to the first exemplary embodiment is an electrophotographic image forming apparatus that forms a toner image on a sheet member P, serving as a recording medium. As shown in FIG. 9, the image forming apparatus 10 includes storage parts 50, an output part 52, an image forming unit 12, a transport mechanism 60, a reversing mechanism 80, a fixing device 100, and a cooling unit 90.

Storage Part

The storage parts 50 accommodate sheet members P. The image forming apparatus 10 includes multiple (for example, two) storage parts 50. The sheet members P are selectively sent out from the storage parts 50.

Output Part

The output part 52 is a portion on which a sheet member P is discharged after an image has been formed thereon. More specifically, after an image is fixed to a sheet member P in the fixing device 100, the sheet member P is cooled in the cooling unit 90 and is discharged on the output part 52.

Image Forming Unit

The image forming unit 12 electrophotographically forms an image on a sheet member P. More specifically, the image forming unit 12 includes toner image forming units 20 that form toner images, and a transfer device 30 that transfers the toner images formed on the toner image forming units 20 to a sheet member P. The image forming unit 12 is an example of a forming unit.

There are multiple toner image forming units 20, so that toner images of different colors are formed. The image forming apparatus 10 includes four toner image forming units 20, which correspond to yellow (Y), magenta (M), cyan (C), and black (K). The letters (Y), (M), (C), and (K) in FIG. 9 represent the components corresponding to these colors.

Toner Image Forming Unit

Figure 8:
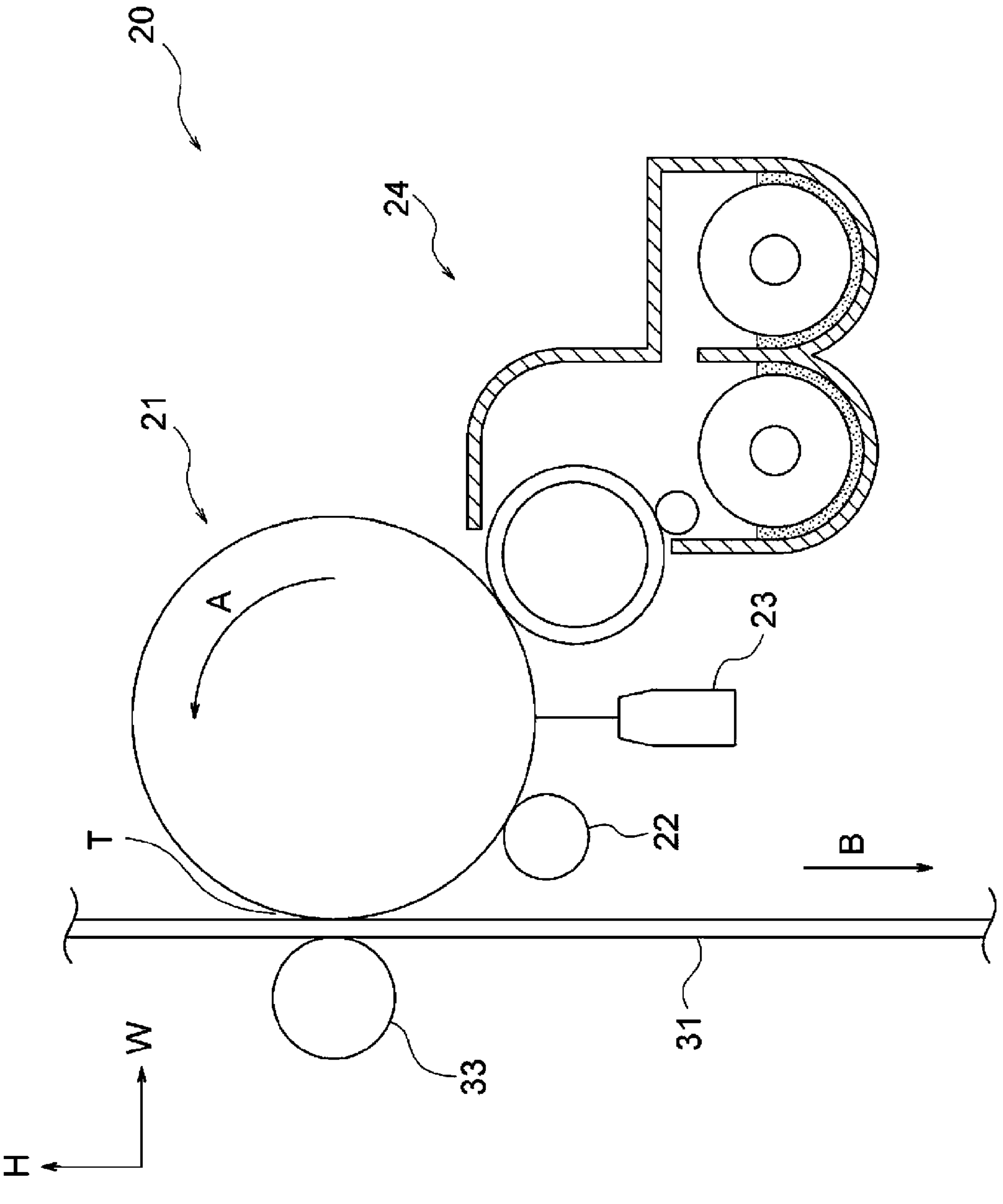
FIG. 8 shows a configuration of a toner image forming unit provided on the image forming apparatus according to the first exemplary embodiment of the present disclosure.

The toner image forming units 20 corresponding to the respective colors have basically the same configuration, except for the toners. More specifically, as shown in FIG. 8, each toner image forming unit 20 includes a photoconductor drum 21 (photoconductor) that rotates in the direction of arrow A, and a charger 22 that charges the photoconductor drum 21. The toner image forming unit 20 also includes an exposure device 23 that exposes the photoconductor drum 21 charged by the charger 22 to form an electrostatic latent image on the photoconductor drum 21, and a developing device 24 that develops, with toner, the electrostatic latent image formed on the photoconductor drum 21 by the exposure device 23 to form a toner image.

Transfer Device

The transfer device 30 first-transfers toner images on the photoconductor drums 21 corresponding to the respective colors to an intermediate transfer body in a superposed manner, and second-transfers the superposed toner image to a sheet member P. More specifically, as shown in FIG. 9, the transfer device 30 includes a transfer belt 31, serving as an intermediate transfer body, first transfer rollers 33, and a transfer part 35.

The first transfer rollers 33 transfer the toner images formed on the photoconductor drums 21 to the transfer belt 31 at first transfer positions T (see FIG. 8) between the photoconductor drums 21 and the first transfer rollers 33.

The transfer belt 31 is an endless belt stretched over multiple rollers 32 in a certain orientation. The transfer belt 31 rotates in the direction of arrow B when at least one of the rollers 32 is rotationally driven, and transports the first-transferred image to a second transfer position NT.

The transfer part 35 transfers the toner image, which has been transferred to the transfer belt 31, to a sheet member P. More specifically, the transfer part 35 includes a second transfer part 34 and an opposing roller 36.

The opposing roller 36 is disposed below the transfer belt 31 so as to oppose the transfer belt 31. The second transfer part 34 is disposed inside the transfer belt 31 such that the transfer belt 31 is located between the second transfer part 34 and the opposing roller 36. The second transfer part 34 is a corotron. At the transfer part 35, the toner image that has been transferred to the transfer belt 31 is transferred to a sheet member P passing through the second transfer position NT by an electrostatic force produced by discharging of the second transfer part 34.

Transport Mechanism

The transport mechanism 60 transports a sheet member P stored in a storage part 50 to the second transfer position NT and then to a heating part 120 (described below).

More specifically, the transport mechanism 60 includes feed-out rollers 62, multiple transport rollers 64, and a chain gripper 66.

The feed-out rollers 62 feed out sheet members P stored in the storage parts 50. The transport rollers 64 transport a sheet member P fed out by a feed-out roller 62 to the chain gripper 66 or transport a sheet member P transported by the chain gripper 66 to the cooling unit 90.

Figure 3:
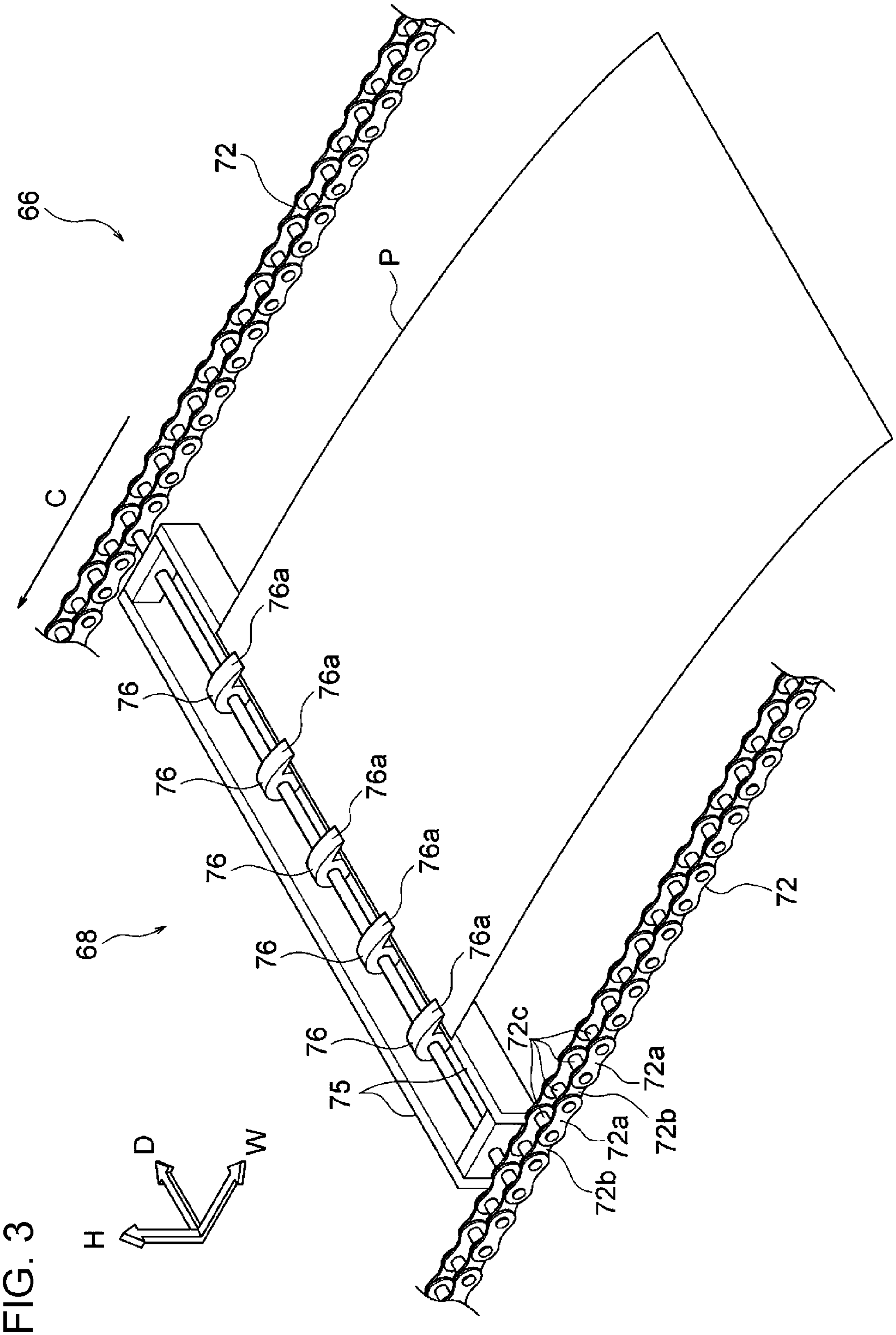
FIG. 3 is a perspective view showing chains, a holding part, and the like provided on the fixing device according to the first exemplary embodiment of the present disclosure.

The chain gripper 66 transports a sheet member P by holding the leading end of the sheet member P. More specifically, as shown in FIG. 3, the chain gripper 66 includes a pair of chains 72 and holding parts 68 that hold the leading ends of sheet members P. A one-dot chain line indicates a portion of the transport path along which a sheet member P is transported in the transport mechanism 60.

In this exemplary embodiment, the chains 72 and the holding parts 68, which constitute the chain gripper 66, also constitute the fixing device 100. Details of the chains 72 and the holding parts 68 will be described below.

Reversing Mechanism

The reversing mechanism 80 reverses a sheet member P. More specifically, as shown in FIG. 9, the reversing mechanism 80 includes multiple transport rollers 82, a reversing device 84, and multiple transport rollers 86.

The transport rollers 82 transport a sheet member P delivered from the fixing device 100 to the reversing device 84. The reversing device 84 reverses the sheet member P by, for example, transporting the sheet member P while turning back several times such that the sheet transport direction changes by, for example, 90 degrees each time to twist the sheet member P in the form of a Mobius strip.

The transport rollers 86 transport the sheet member P reversed in the reversing device 84 to the chain gripper 66.

Fixing Device

The fixing device 100 fixes a toner image transferred to a sheet member P by the transfer device 30 to the sheet member P. Details of the fixing device 100 will be described below.

Cooling Unit

The cooling unit 90 cools a sheet member P heated in the fixing device 100. As shown in FIG. 9, the cooling unit 90 is located downstream of the fixing device 100 in the sheet transport direction. The cooling unit 90 includes two cooling rollers 92 arranged side-by-side in the width direction of the apparatus. Because the two cooling rollers 92 have the same configuration, one of the cooling rollers 92 will be described.

Figure 7:
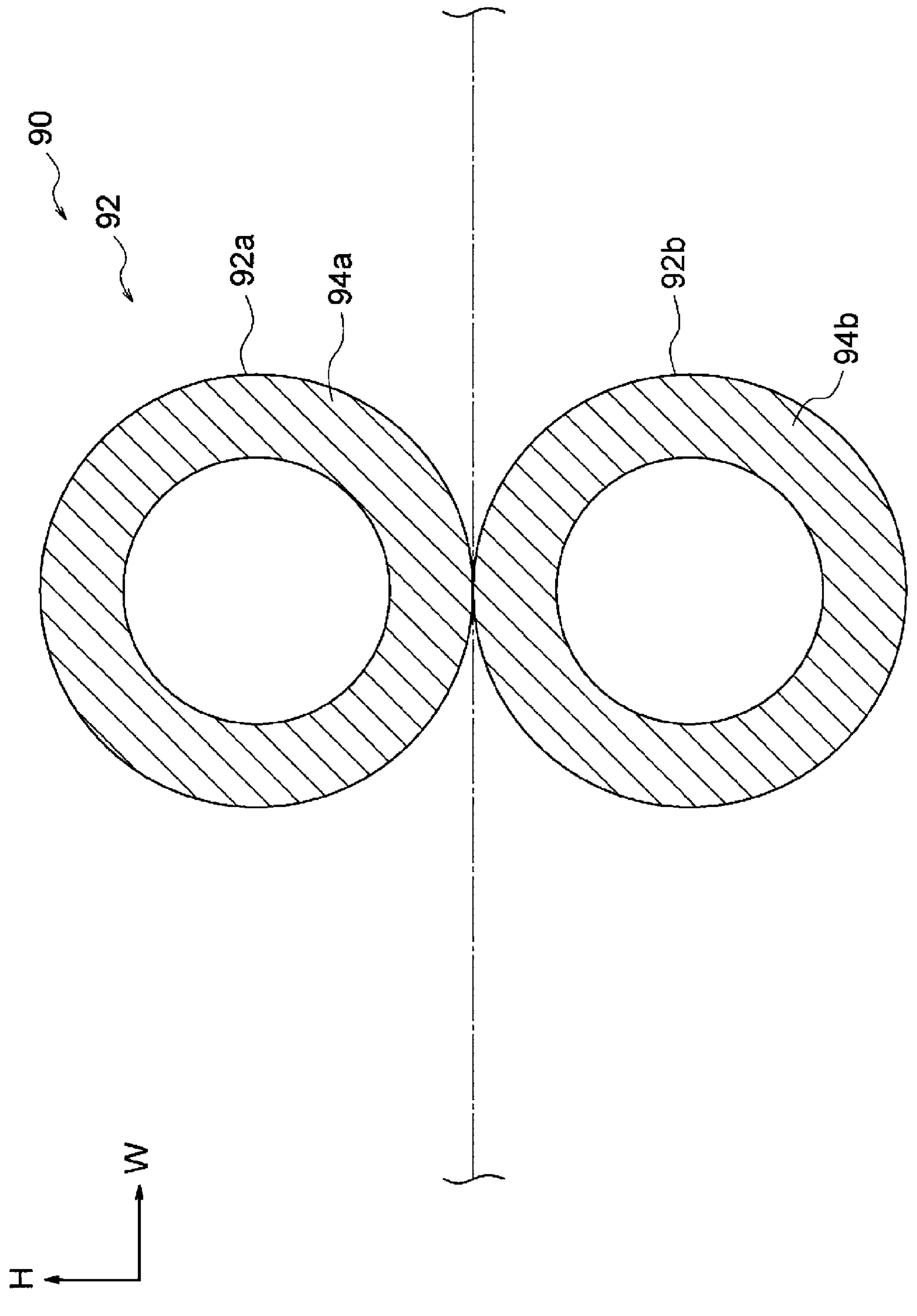
FIG. 7 is a sectional view showing a cooling unit provided on an image forming apparatus according to the first exemplary embodiment of the present disclosure.

As shown in FIG. 7, the cooling rollers 92 include a roller 92*a* disposed above the sheet transport path and a roller 92*b* disposed below the sheet transport path.

The rollers 92*a* and 92*b* are cylindrical and extend in the depth direction of the apparatus. The rollers 92*a* and 92*b* have cylindrical base members 94*a* and 94*b*. The base members 94*a* and 94*b* are aluminum pipes, and flows of air generated by an air-sending mechanism (not shown) pass through the base members 94*a* and 94*b*. The flows of air reduce the surface temperatures of the rollers 92*a* and 92*b*, compared with a configuration in which the flows of air are not generated.

In this configuration, the roller 92*b* receives a rotational force from a driving member (not shown) and rotates. Furthermore, the roller 92*a* is driven by the roller 92*b* and rotates. The rollers 92*a* and 92*b* transport the sheet member P nipped therebetween to cool the sheet member P.

Effect of Image Forming Apparatus

The image forming apparatus 10 shown in FIG. 9 forms an image as follows.

First, the energized chargers 22 corresponding to the respective colors (see FIG. 8) uniformly charge the surfaces of the corresponding photoconductor drums 21 to a predetermined negative electric potential. Then, based on the image data input from the outside, the exposure devices 23 radiate exposure light onto the surfaces of the charged photoconductor drums 21 to form electrostatic latent images.

As a result, electrostatic latent images corresponding to the image data are formed on the surfaces of the photoconductor drums 21. The developing devices 24 develop the electrostatic latent images into visible toner images. The transfer device 30 transfers the toner images formed on the surfaces of the photoconductor drums 21 to the transfer belt 31.

A sheet member P fed out from a storage part 50 shown in FIG. 9 to the sheet transport path by a feed-out roller 62 and transported by the chain gripper 66 is sent to a second transfer position NT, where the transfer belt 31 and the opposing roller 36 are in contact with each other. At the second transfer position NT, the sheet member P is transported between the transfer belt 31 and the opposing roller 36, whereby the toner image on the surface of the transfer belt 31 is transferred to the surface of the sheet member P.

Furthermore, the fixing device 100 fixes, to the sheet member P, the toner image transferred to the surface of the sheet member P, and the sheet member P is transported to the cooling unit 90. The cooling unit 90 cools the sheet member P to which the toner image has been fixed, and discharges the sheet member P to the output part 52.

When a toner image is to be formed on the back surface of a sheet member P, the sheet member P that has been transported by the chain gripper 66 and has passed through the fixing device 100 is transported to the transport rollers 82 of the reversing mechanism 80. The sheet member P transported by the transport rollers 82 is reversed by the reversing device 84. Furthermore, the transport rollers 86 transport the reversed sheet member P to the chain gripper 66. The chain gripper 66 transports the sheet member P. Then, the above-described process is performed again to form a toner image on the back surface of the sheet member P.

Configuration of Relevant Part

Next, the fixing device 100 will be described.

Figure 2:
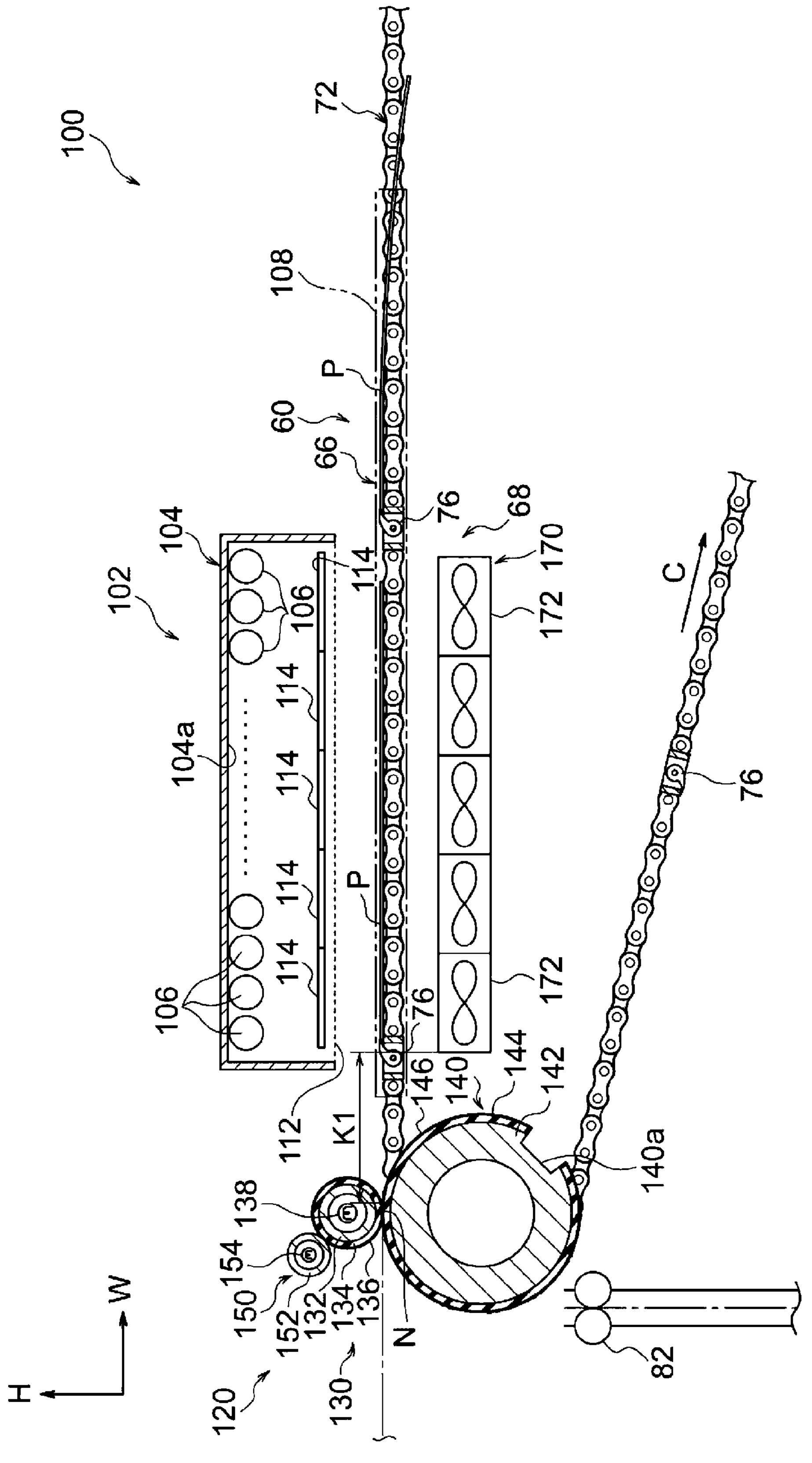
FIG. 2 is a side view of the fixing device according to the first exemplary embodiment of the present disclosure.

As shown in FIG. 2, the fixing device 100 includes the chain gripper 66 and a preheating part 102 that is located downstream of the transfer device 30 (see FIG. 9) in the sheet transport direction and that heats the sheet member P in a non-contact manner.

The fixing device 100 also includes the heating part 120 that comes into contact with the sheet member P to apply heat and pressure, a blowing unit 170, and heat shielding members 108 (see FIG. 1) that block the heat radiated from the preheating part 102 and transferred to the chains 72 of the chain gripper 66.

Chain Gripper

The chain gripper 66 includes a pair of chains 72 and the holding parts 68 for holding sheet members P. The chains 72 are an example of circulating parts.

Chains

As shown in FIG. 3, the pair of chains 72 are disposed at a distant from each other in the depth direction of the apparatus. The chains 72 are endless chains and include multiple metal outer plates 72*a*, multiple metal inner plates 72*b*, and pins 72*c* connecting the outer plates 72*a* and the inner plates 72*b*. In this exemplary embodiment, the depth direction of the apparatus is equal to the width direction of the sheet member P to be transported.

The chains 72 are disposed at one end and the other end of the opposing roller 36 (see FIG. 9) in the axial direction and are stretched over a pair of sprockets (not shown) having axes extending in the depth direction of the apparatus, a pair of sprockets 71 (see FIG. 5) disposed at one end and the other end of a pressure roller 140 (described below) in the axial direction, and a pair of sprockets 74 (see FIG. 9) disposed at a distance from each other in the depth direction of the apparatus. When any of these pairs of sprocket rotate, the chains 72 circulates in the direction of arrow C. The ends of the holding parts 68 for holding sheet members P are attached to the chains 72.

Holding Part

As shown in FIG. 3, the holding parts 68 are attached to the chains 72 at both ends thereof and each include an attaching member 75 extending in the depth direction of the apparatus and grippers 76 attached to the attaching member 75.

The holding parts 68 are disposed at predetermined intervals in the circumferential direction (circulating direction) of the chains 72.

The grippers 76 are attached to the attaching member 75 at predetermined intervals in the depth direction of the apparatus. The grippers 76 hold the leading end of a sheet member P. More specifically, the grippers 76 have claws 76*a*. The attaching member 75 has a contact portion 75*a* (see FIG. 6) with which the claws 76*a* come into contact.

The grippers 76 hold a sheet member P by pinching the leading end of a sheet member P between the claws 76*a* and the contact portion 75*a*. The grippers 76 are configured such that, for example, the claws 76*a* are urged against the contact portion 75*a* by springs or the like, and the claws 76*a* are brought toward and away from the contact portion 75*a* by the effect of cams or the like.

In this configuration, in the chain gripper 66, when the chains 72 circulate in the direction of arrow C while the grippers 76 are holding the leading end of a sheet member P, the sheet member P is transported. The chain gripper 66 shown in FIG. 9 transports the sheet member P, which has been transported by the transport rollers 64, to the second transfer position NT, through the preheating part 102, and then to the heating part 120.

Heating Part

As shown in FIG. 2, the heating part 120 is located downstream of the preheating part 102 in the sheet transport direction. The heating part 120 includes a heating roller 130 that comes into contact with a sheet member P being transported to heat the sheet member P, a pressure roller 140 that presses the sheet member P toward the heating roller 130, and a driven roller 150 that is rotated by the rotating heating roller 130.

Heating Roller

As shown in FIG. 2, the heating roller 130 is disposed so as to come into contact with the top surface of a sheet member P being transported and extends in the depth direction of the apparatus such that the axis thereof extends in the depth direction of the apparatus. The heating roller 130 includes a cylindrical base member 132, a rubber layer 134 formed so as to cover the overall circumference of the base member 132, a separating layer 136 formed so as to cover the overall circumference of the rubber layer 134, and a heater 138 accommodated in the base member 132. The outside diameter of the outer circumferential surface of the separating layer 136 of the heating roller 130 is set to be, for example, 80 mm.

The base member 132 is an aluminum pipe having a thickness of, for example, 20 mm. Furthermore, the rubber layer 134 is made of silicone rubber and has a thickness of, for example, 6 mm. Furthermore, the separating layer 136 is made of a tetrafluoroethylene-perfluoroethylene copolymer (PFA resin) and has a thickness of, for example, 50 μm.

Figure 5:
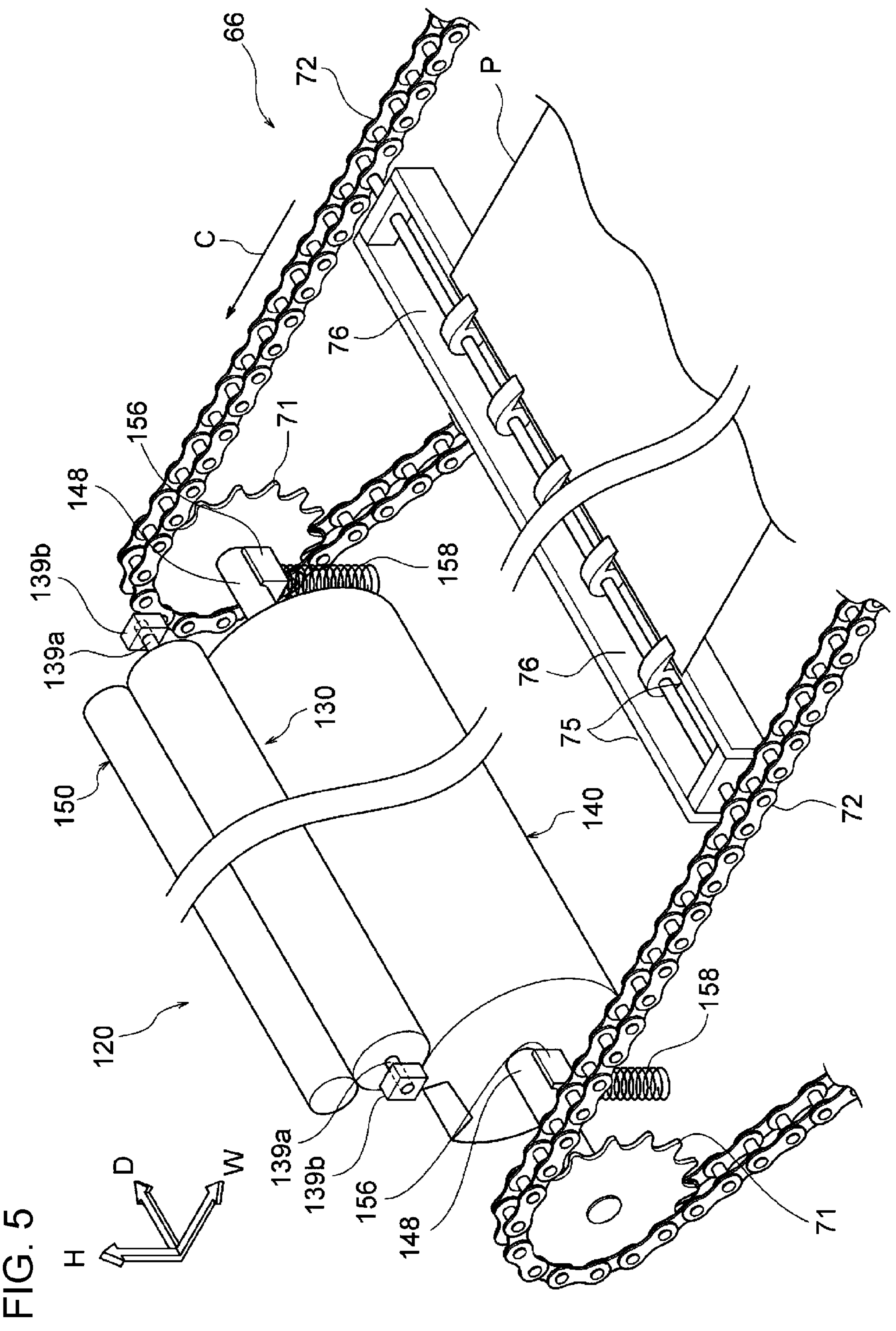
FIG. 5 is a perspective view showing a heating part, and the like provided on the fixing device according to the first exemplary embodiment of the present disclosure.

As shown in FIG. 5, shaft portions 139*a* extending in the depth direction of the apparatus are formed at both ends of the heating roller 130 in the depth direction of the apparatus, and support members 139*b* for supporting the corresponding shaft portions 139*a* are provided. With this structure, the heating roller 130 is rotatably supported by the support members 139*b* at both ends thereof.

Driven Roller

As shown in FIGS. 2 and 5, the driven roller 150 is disposed on the opposite side of the heating roller 130 from the sheet member P being transported, so as to extend in the depth direction of the apparatus, such that the axis thereof extends in the depth direction of the apparatus. Furthermore, the driven roller 150 includes a cylindrical base member 152, and a heater 154 accommodated in the base member 152. The outside diameter of the outer circumferential surface of the base member 152 of the driven roller 150 is, for example, 50 mm.

The base member 152 is an aluminum pipe having a thickness of, for example, 10 mm. The driven roller 150 is rotatably supported by support members (not shown) at both ends thereof.

In this configuration, the driven roller 150 is driven and rotated by the heating roller 130. The driven roller 150 heats the heating roller 130. Because the heating roller 130 is heated by the driven roller 150, and the heating roller 130 has the heater 138, the surface temperature of the heating roller 130 is brought to a predetermined range of 180° C. to 200° C.

Pressure Roller

As shown in FIGS. 2 and 5, the pressure roller 140 is disposed so as to oppose the heating roller 130 with a sheet member P being transported therebetween, come into contact with the lower side of the sheet member P being transported, and extend in the depth direction of the apparatus such that the axis thereof extends the depth direction of the apparatus. The pressure roller 140 includes a cylindrical base member 142, a rubber layer 144 formed so as to cover the base member 142, a separating layer 146 formed so as to cover the rubber layer 144, and a pair of shaft portions 148 (see FIG. 5) formed at both ends in the depth direction of the apparatus. The outside diameter of the outer circumferential surface of the separating layer 146 of the pressure roller 140 is, for example, 225 mm. The outside diameter of the pressure roller 140 is larger than the outside diameter of the heating roller 130.

The base member 142 is an aluminum pipe having a thickness of, for example, 20 mm. Furthermore, the rubber layer 144 is made of silicone rubber and has a thickness of, for example, 1 mm. Furthermore, the separating layer 146 is made of a tetrafluoroethylene-perfluoroethylene copolymer (PFA resin) and has a thickness of, for example, 50 μm.

Figure 6:
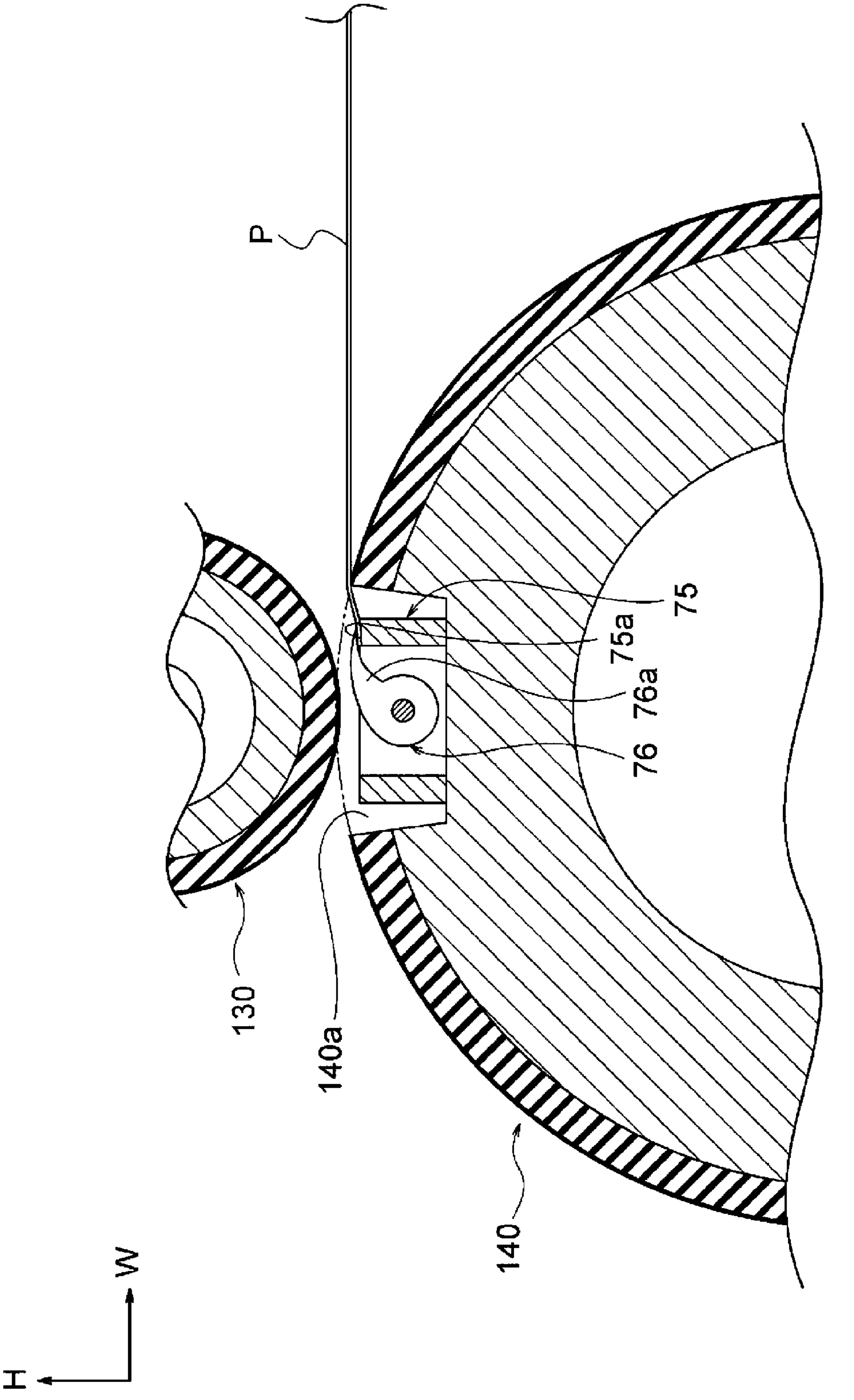
FIG. 6 is a sectional view showing the heating part, and the like provided on the fixing device according to the first exemplary embodiment of the present disclosure.

Furthermore, as shown in FIG. 6, the pressure roller 140 has, in the outer circumferential surface thereof, a recess 140*a* extending in the depth direction of the apparatus. When a sheet member P passes between the pressure roller 140 and the heating roller 130, the grippers 76 gripping the leading end of the sheet member P are stored in the recess 140*a*.

As shown in FIG. 5, the shaft portions 148 are formed at both ends of the pressure roller 140 in the depth direction of the apparatus. The shaft portions 148 have a smaller diameter than the outer circumferential surface of the separating layer 146 of the pressure roller 140 and extend in the axial direction.

In this configuration, the pressure roller 140 receives a rotational force from a driving member (not shown) and rotates. The rotating pressure roller 140 rotates the heating roller 130, and the rotating heating roller 130 rotates the driven roller 150. As a result of the heating roller 130 and the pressure roller 140 nipping and transporting a sheet member P to which a toner image has been transferred, the toner image is fixed to the sheet member P. The heating roller 130 and the pressure roller 140 constitute a pair of transport portions 122, which nip and transport the sheet member P while rotating and heat the sheet member P.

Other Configurations

As shown in FIG. 5, the heating part 120 includes support members 156 for supporting the pressure roller 140, and urging members 158 for urging the pressure roller 140 toward the heating roller 130 through the support members 156. The support members 156 are provided in pairs. The pair of support members 156 are disposed so as to rotatably support the shaft portions 148 of the pressure roller 140 from below.

The urging members 158 are compression springs provided in pairs. The urging members 158 are disposed on the opposite side of the support members 156 from the shaft portions 148.

In this configuration, as a result of the pair of urging members 158 urging the pressure roller 140 toward the heating roller 130, the pressure roller 140 presses the sheet member P toward the heating roller 130. Then, as shown in FIG. 2, a portion of the heating roller 130 urged by the pressure roller 140 is deformed, forming a nip part N, where the heating roller 130 and the pressure roller 140 are in contact with each other.

Preheating Part

As shown in FIG. 2, the preheating part 102 is located downstream of the second transfer position NT (see FIG. 9), where a toner image is transferred to a sheet member P, and upstream of the heating part 120 in the sheet transport direction. Furthermore, the preheating part 102 is disposed above a sheet member P being transported (i.e., the side to which a toner image is transferred). The preheating part 102 includes a reflection member 104, multiple infrared heaters 106 (hereinbelow, the "heaters 106"), heating plates 114, and a wire screen 112.

Reflection Member

The reflection member 104 is made of an aluminum plate in the shape of a shallow box that is open on the side facing a sheet member P being transported. In other words, as viewed in the width direction, the reflection member 104 has a U shape with an opening facing a sheet member P being transported. In this exemplary embodiment, as viewed from above, the reflection member 104 covers, both in the depth direction and width direction of the apparatus, the sheet member P being transported. The reflection member 104 is an example of a reflection part.

Figure 1:
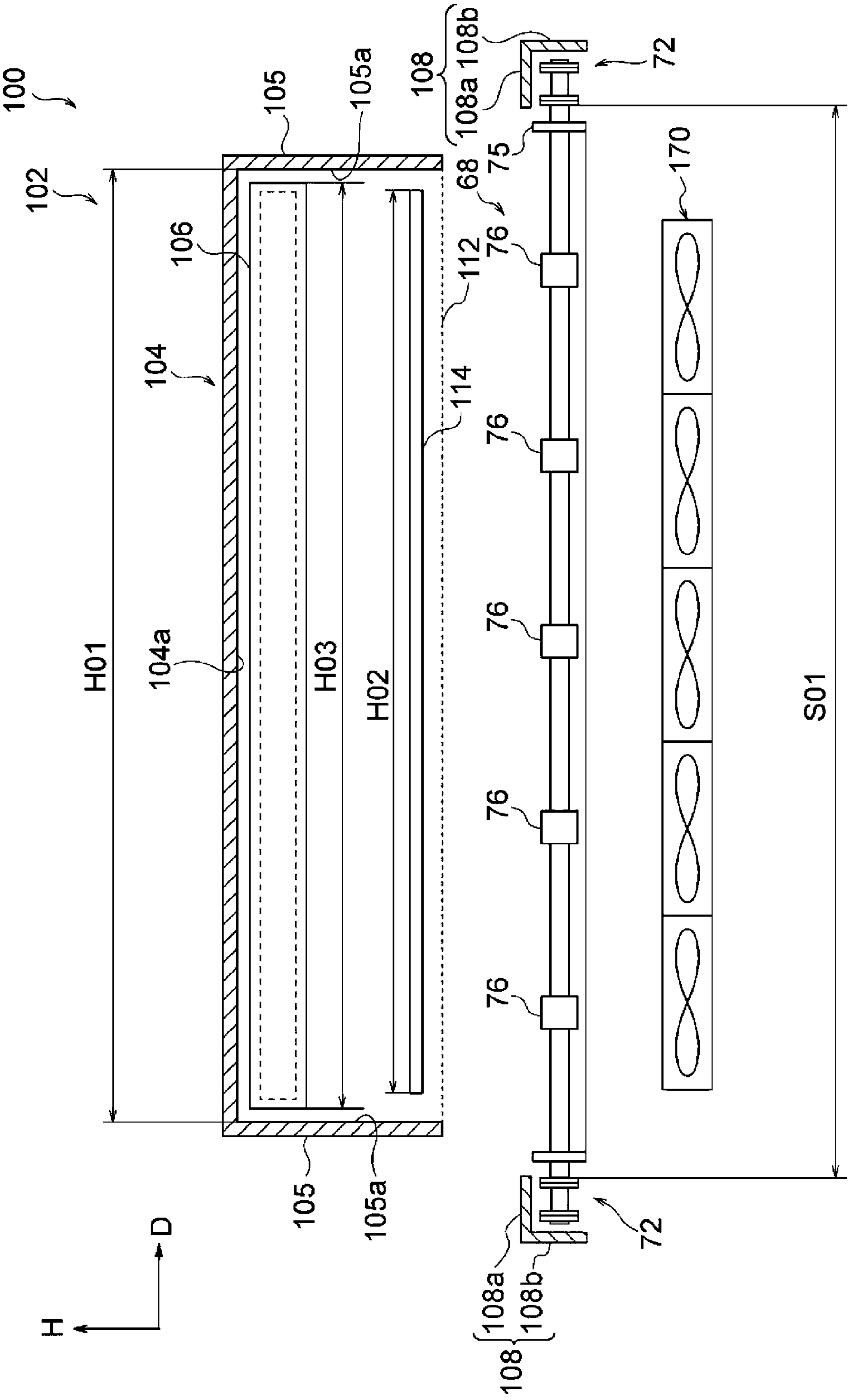
FIG. 1 is a front view of a fixing device according to a first exemplary embodiment of the present disclosure.

As shown in FIG. 1, the heating plates 114 and the heaters 106 are disposed in the reflection member 104, in this order from the side closer to a sheet member P being transported. The reflection member 104 has a reflection surface 104*a* that reflects infrared rays, which are heat rays radiated by the heaters 106, toward the heating plates 114. In other words, as shown in FIG. 2, the reflection surface 104*a*, which reflects the infrared rays toward the heating plates 114, is disposed on the opposite side of the heaters 106 and the heating plates 114 from the chains 72. Thus, the reflection surface 104*a* serves as a radiation-direction changing member that changes the radiation direction of the infrared rays radiated from the heaters 106 in directions other than the direction of the heating plates 114 to the direction of the heating plates 114.

Furthermore, as shown in FIG. 1, a reflection area (H01 in FIG. 1) in which the reflection surface 104*a* reflects the infrared rays toward the heating plates 114 is located in a space (S01 in FIG. 1) between the chains 72 in the depth direction of the apparatus. In other words, the chains 72 and the reflection area H01 do not overlap each other in the depth direction of the apparatus.

Herein, "the space S01 between the chains 72 in the depth direction of the apparatus" is an area between, in the depth direction of the apparatus, the portions of the chains 72 closest to the other chains 72.

The reflection member 104 also has a pair of side plates 105 located on both sides of the heaters 106 and the heating plates 114 in the depth direction of the apparatus. As described above, the reflection member 104 accommodates the heating plates 114 and the heaters 106; that is, the lower edges of the side plates 105 are located below the heating plates 114 in the top-bottom direction of the apparatus. In other words, the lower edges of the side plates 105 project downward with respect to the heating plates 114 in the top-bottom direction of the apparatus.

Furthermore, the pair of side plates 105 have opposing faces 105*a* that face each other. The pair of opposing faces 105*a* are located within the space S01 between the chains 72 in the depth direction of the apparatus. The opposing faces 105*a* are an example of side surfaces.

Heater

The heaters 106 are cylindrical infrared heaters extending in the depth direction of the apparatus. As shown in FIG. 1, the heaters 106 are opposed to the reflection surface 104*a* of the reflection member 104 in the top-bottom direction of the apparatus. As shown in FIG. 2, the heaters 106 are arranged side-by-side in the width direction of the apparatus. The heaters 106 are an example of radiation parts that radiate heat rays.

In this configuration, the heaters 106 that are energized by a power supply (not shown) radiate infrared rays having maximum spectral radiance at a wavelength of 3 μm to 5 μm.

Heating Plate

The heating plates 114 are made of, for example, stainless steel plates having a thickness of 1 mm and, as shown in FIG. 2, are located between the chains 72 and the heaters 106 as viewed in the depth direction of the apparatus. In other words, as viewed in the depth direction of the apparatus, the heaters 106 are disposed on the opposite side of the heating plates 114 from the chains 72. The heating plates 114 are located at a distance of, for example, 30 mm, in the top-bottom direction of the apparatus, from the leading end of a sheet member P being transported. The heating plates 114 are an example of a heating part.

Furthermore, the heating plates 114 are arranged side-by-side in the width direction of the apparatus such that the place surfaces thereof face the sheet member P being transported. The thus-arranged heating plates 114 form a rectangular shape extending in the width direction of the apparatus, as viewed in the top-bottom direction of the apparatus. In this exemplary embodiment, as viewed from above, the heating plates 114 arranged without gaps cover a sheet member P being transported. In other words, the thus-arranged heating plates 114 occasionally heat the entirety of a sheet member P being transported at a time.

As shown in FIG. 1, the heating plates 114 are located within the space S01 between the chains 72 in the depth direction of the apparatus. In other words, an area (H02 in FIG. 1) in which the heating plates 114 are arranged is located within the space S01 between the chains 72 in the depth direction of the apparatus. In still other words, the chains 72 and the area H02, in which the heating plates 114 are arranged, do not overlap each other in the depth direction of the apparatus.

Furthermore, the heating plates 114 are located within an area (H03 in FIG. 1) in which the heaters 106 are arranged in the depth direction of the apparatus. In other words, the area H02, in which the heating plates 114 are arranged, is located within the area (H03 in FIG. 1) in which the heaters 106 are arranged, in the depth direction of the apparatus. The heating plates 114 have black coatings on the surfaces facing the heaters 106. The areas H02 and H03 are located within the reflection area H01 in the depth direction of the apparatus.

In this configuration, the heating plates 114 are heated by absorbing infrared rays radiated by the heaters 106 and infrared rays reflected by the reflection surface 104*a* and release heat. The heating plates 114 are heated to a temperature of, for example, 600° C. to 1175° C. and heat, in a non-contact manner, a sheet member P being transported.

In the width direction of the apparatus, the heating plates 114 are arranged in the same area as the area in which the heaters 106 are arranged.

Wire Screen

As shown in FIG. 1, the wire screen 112 is fixed to the edge of the reflection member 104 with fixing members (not shown) to divide the inside of the reflection member 104 from the outside. The wire screen 112 prevents contact between the heating plates 114 and the sheet member P being transported.

Blowing Unit

Figure 4:
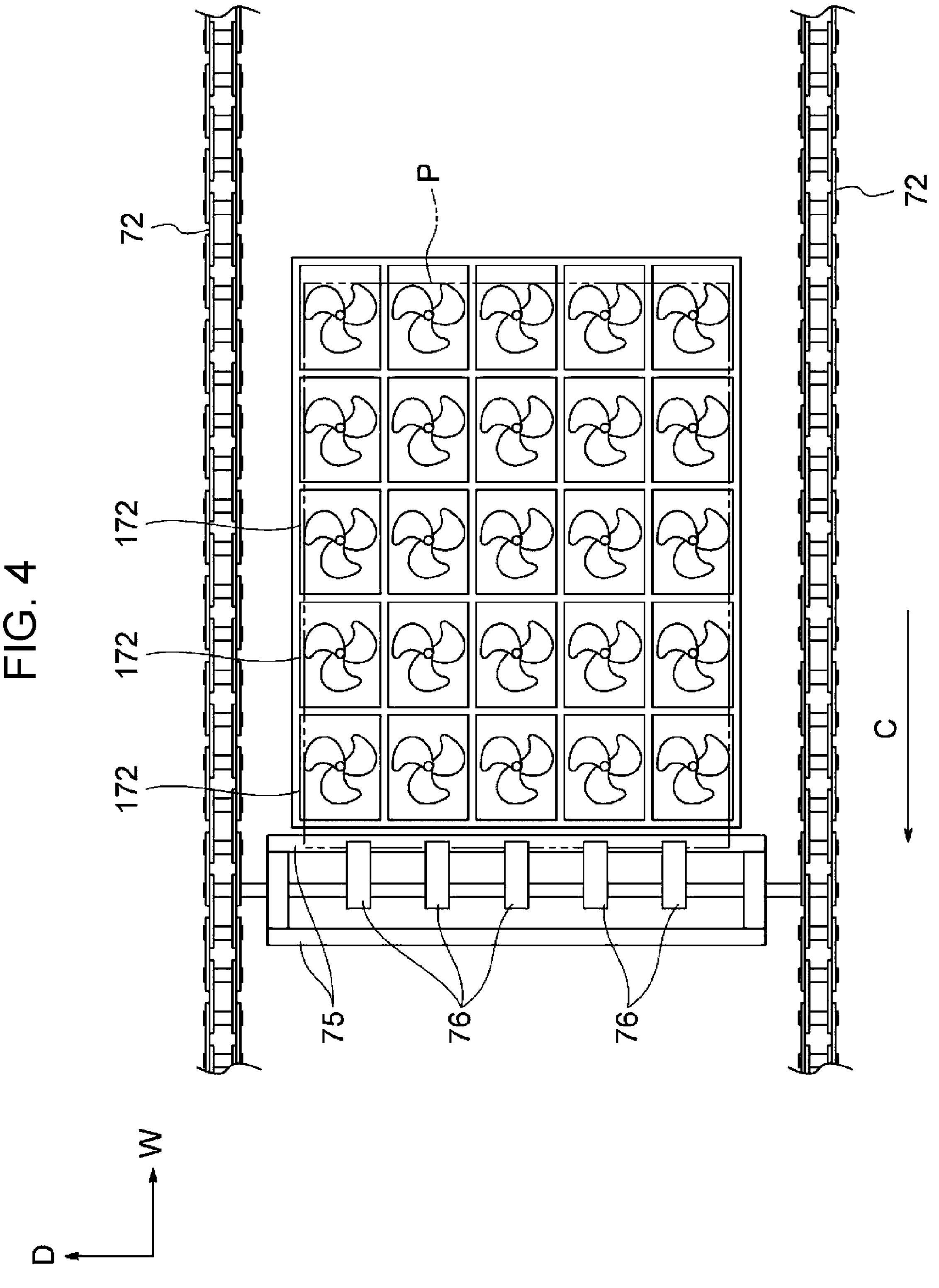
FIG. 4 is a plan view showing the chains, the holding part, and the like provided on the fixing device according to the first exemplary embodiment of the present disclosure.

As shown in FIG. 2, the blowing unit 170 is disposed so as to oppose the preheating part 102 in the top-bottom direction of the apparatus, and the sheet member P being transported passes between the blowing unit 170 and the preheating part 102. As shown in FIG. 4, the blowing unit 170 includes multiple fans 172 arranged in the width direction and the depth direction of the apparatus.

In this configuration, the orientation of the sheet member P being transported is stabilized by the fans 172 blowing air at the sheet member P. The fans 172 serve as orientation stabilizers for stabilizing the orientation of the sheet member P being transported.

Heat Shielding Member

The heat shielding members 108 are provided in pairs and are made of, for example, stainless steel plates having a thickness of 1 mm. As shown in FIG. 1, the heat shielding members 108 are opposed to the chains 72 in the top-bottom direction of the apparatus, as viewed in the width direction of the apparatus. The heat shielding members 108 are an example of heat shielding parts.

More specifically, as shown in FIG. 2, the heat shielding members 108 are disposed at least in the area in which the preheating part 102 is disposed, in the width direction of the apparatus. Furthermore, as shown in FIG. 1, the heat shielding members 108 have an L shape as viewed in the width direction of the apparatus and each include an opposing plate 108*a* that opposes the corresponding chain 72 in the top-bottom direction of the apparatus and a side plate 108*b* that covers the corresponding chain 72 from the outside in the depth direction of the apparatus. The top-bottom direction of the apparatus is an example of an intersecting direction.

The upward-facing surfaces of the opposing plates 108*a* are uncoated and have an average surface roughness Ra (JIS B 0031) of 1 μm or less. Furthermore, in the depth direction of the apparatus, the heat shielding members 108 are located on the outer sides of the area H02, in which the heating plates 114 are arranged. In other words, the heat shielding members 108 and the area H02, in which the heating plates 114 are arranged, do not overlap each other in the depth direction of the apparatus.

In this configuration, the heat shielding members 108 block the heat radiated from the heating plates 114 of the preheating part 102 and transferred to the chains 72.

Effect of Relevant Part Configuration

Next, the effect of the fixing device 100 will be described in comparison with that of a fixing device 600 according to a comparative example. First, the configuration of the fixing device 600 according to the comparative example will be described below, focusing on the difference from the fixing device 100.

Fixing Device 600

Figure 10:
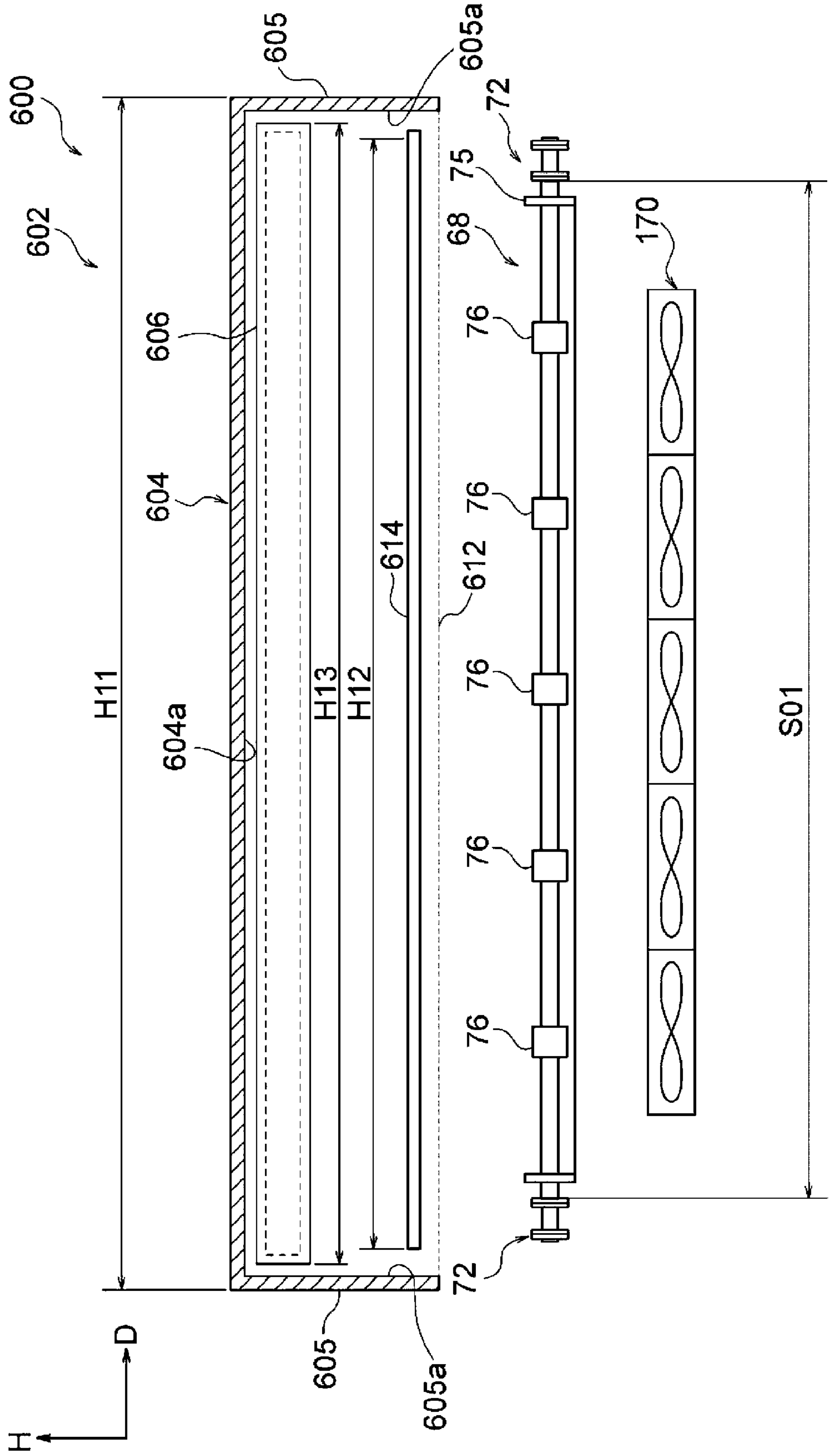
FIG. 10 is a front view of a fixing device according to a comparative example of the present disclosure.

As shown in FIG. 10, the fixing device 600 includes a preheating part 602 that heats, in a non-contact manner, a sheet member P being transported, the chains 72, and the holding parts 68. The fixing device 600 also includes the heating part 120 (see FIG. 2) that comes into contact with the sheet member P to apply heat and pressure thereto, and the blowing unit 170. The fixing device 600 does not have heat shielding members that block the heat radiated from heating plates 614 and transferred to the chains 72.

Preheating Part 602

As shown in FIG. 10, the preheating part 602 includes a reflection member 604, multiple infrared heaters 606 (hereinbelow, "heaters 606"), the heating plates 614, and a wire screen 612.

The reflection member 604 is made of an aluminum plate in the shape of a shallow box that is open on the side facing a sheet member P being transported. The reflection member 604 has a reflection surface 604*a* that reflects infrared rays, which are heat rays radiated by the heaters 606, toward the heating plates 614.

In the depth direction of the apparatus, a reflection area (H11 in FIG. 10) in which the reflection surface 604*a* reflect the infrared rays toward the heating plates 614 is not located within the space S01 between the chains 72, but extends beyond the space S01 between the chains 72.

The reflection member 604 also has a pair of side plates 605 located on both sides of the heaters 606 and the heating plates 614 in the depth direction of the apparatus. The lower edges of the side plates 605 are located below the heating plates 614 in the top-bottom direction of the apparatus.

Furthermore, the pair of side plates 605 have opposing faces 605*a* that face each other. The pair of opposing faces 605*a* are not disposed in the space S01 between the chains 72 in the depth direction of the apparatus.

The heaters 606 are cylindrical infrared heaters extending in the depth direction of the apparatus. As shown in FIG. 10, the heaters 606 are opposed to the reflection surface 604*a* of the reflection member 604 in the top-bottom direction of the apparatus. Furthermore, the heaters 606 are arranged side-by-side in the width direction of the apparatus.

The heating plates 614 are arranged side-by-side in the width direction of the apparatus so as to face a sheet member P being transported. The thus-arranged heating plates 614 form a rectangular shape extending in the width direction of the apparatus, as viewed in the top-bottom direction of the apparatus. An area (H12 in FIG. 10) in which the heating plates 614 are arranged is not located within the space S01 between the chains 72 in the depth direction of the apparatus, but extends beyond the space S01 between the chains 72. In other words, the heating plates 614 and the chains 72 overlap each other in the depth direction of the apparatus. In still other words, the chains 72 and the heating plates 614 face each other in the top-bottom direction of the apparatus, as viewed in the width direction of the apparatus.

Furthermore, in the depth direction of the apparatus, the area H12, in which the heating plates 614 are arranged, is located within an area (H13 in FIG. 10) in which the heaters 606 are arranged.

Furthermore, the wire screen 612 is fixed to the edge of the reflection member 604 (not shown) with fixing members (not shown) to divide the inside of the reflection member 604 from the outside, as shown in FIG. 10.

Effect of Fixing Devices 100 and 600

When the fixing devices 100 and 600 are not operating, the heaters 106 and 606 are not energized, and the chains 72 are stopped. The fans 172 of the blowing unit 170 are stopped.

When an image forming operation is started, the chains 72 start to circulate and transport a sheet member P to which a toner image has been transferred. Furthermore, the fans 172 are activated to blow air to the sheet member P from below, so that the sheet surfaces of the sheet member P face upward and downward.

Furthermore, in the fixing devices 100 and 600 shown in FIG. 1, 10, the heaters 106 and 606 of the preheating parts 102 and 602 are energized. The heating plates 114 and 614 are heated by absorbing infrared rays radiated by the energized heaters 106 and 606 and infrared rays reflected by the reflection surfaces 104*a* and 604*a* and release the heat. Then, the heated heating plates 114 and 614 heat, in a non-contact manner, a sheet member P transported by the circulating chains 72. As a result of the sheet member P being heated, the toner constituting the toner image on the sheet member P is softened.

Furthermore, in the heating part 120 shown in FIG. 2, the heating roller 130 and the pressure roller 140 nip and transport the sheet member P that has been heated by the heating plates 114 and 614 of the preheating parts 102 and 602 to fix the toner image to the sheet member P. The sheet member P, to which the toner image has been fixed, is discharged outside the apparatus through the cooling unit 90 (see FIG. 9).

In the preheating part 602 of the fixing device 600 according to the comparative example, as shown in FIG. 10, the area H12, in which the heating plates 614 are arranged, is not located within the space S01 between the chains 72, but extends beyond the space S01 between the chains 72 in the depth direction of the apparatus. Hence, the heat radiated by the heating plates 614 heats the chains 72, causing the chains 72 to elongate in the circulating direction. If the amount of elongation of one chain 72 differs from that of the other, the sheet member P being transported is skewed with respect to the transport direction and is nipped between the heating roller 130 and the pressure roller 140 in this state. This may crease the sheet member P.

In contrast, as shown in FIG. 1, in the preheating part 102 of the fixing device 100 according to this exemplary embodiment, the area H02, in which the heating plates 114 are arranged, is located within the space S01 between the chains 72 in the depth direction of the apparatus. Hence, compared with a configuration using the fixing device 600, the chains 72 are prevented from being heated by the heating plates 114. As a result of an increase in temperature of the chains 72 being prevented, skew of a sheet member P being transported with respect to the transport direction is prevented, compared with the configuration using the fixing device 600. Thus, creases in the sheet member P nipped between the heating roller 130 and the pressure roller 140 is prevented.

As described above, in the fixing device 100, the area H02, in which the heating plates 114 are arranged, is located within the space S01 between the chains 72 in the depth direction of the apparatus. Hence, compared with the configuration using the fixing device 600, the chains 72 are prevented from being heated by the heating plates 114.

Furthermore, in the fixing device 100, the heating plates 114 having plate surfaces facing a sheet member P being transported absorb infrared rays radiated by the heaters 106 and release heat to heat the sheet member P. Hence, for example, compared with a configuration using the heating plates 114 with corrugated plate surfaces, difference in distance between the heating plates 114 and the sheet member P at different positions is prevented, and thus, unevenness in the temperature of the heated sheet member P is prevented.

Furthermore, in the fixing device 100, the area H02, in which the heating plates 114 are arranged, is located within the area H03, in which the heaters 106 are arranged, in the depth direction of the apparatus. Hence, compared with a configuration in which the area in which the heating plates are arranged extends beyond the area in which the heaters are arranged in the depth direction of the apparatus, unevenness in the temperature of the heating plates 114 is prevented.

Furthermore, in the fixing device 100, because the unevenness in the temperature of the heating plates 114 is prevented, the overall heating plates 114 uniformly absorb the infrared rays. Hence, compared with a configuration in which the area in which the heating plates are arranged extends beyond the area in which the heaters are arranged in the depth direction of the apparatus, the temperature of the overall heating plates 114 uniformly increases.

Furthermore, in the fixing device 100, the reflection area H01, in which the reflection surface 104*a* reflects the infrared rays toward the heating plates 114, is located within the space S01 between the chains 72 in the depth direction of the apparatus. Hence, compared with a configuration in which, as in the fixing device 600, the reflection area H11 of the reflection surface 604*a* is not located within the space S01 between the chains 72, but extends beyond the space S01 between the chains 72, the chains 72 are prevented from being heated by the infrared rays reflected from the reflection surface 104*a*.

Furthermore, in the fixing device 100, the pair of opposing faces 105*a* formed in the reflection member 104 are located within the space S01 between the chains 72. Hence, compared with a configuration in which, as in the fixing device 600, the pair of opposing faces 605*a* are not located within the space S01 between the chains 72, the heat inside the reflection member 104 is not radiated toward the chains 72, and thus, an increase in the temperature of the chains 72 is prevented.

Furthermore, in the fixing device 100, the lower edges of the side plates 105 are located below the heating plates 114 in the top-bottom direction of the apparatus. Hence, compared with a configuration in which the lower edges of the side plates are located above the heating plates, the heat inside the reflection member 104 is not radiated toward the chains 72, and thus, an increase in the temperature of the chains 72 is prevented.

Furthermore, in the fixing device 100, the heat shielding members 108 with the opposing plates 108*a* facing the chains 72 in the top-bottom direction of the apparatus are arranged on the outer side of the area H02, in which the heating plates 114 are arranged, in the depth direction of the apparatus. Hence, compared with a configuration in which the heat shielding members extend to the area in which the heating plates are arranged in the depth direction of the apparatus, the heat shielding members 108 are prevented from being heated, and thus, an increase in the temperature of the chains 72 is prevented.

Furthermore, in the fixing device 100, the upward-facing surfaces of the opposing plates 108*a* of the heat shielding members 108 are not coated and have an average surface roughness Ra (JIS B 0031) of 1 μm or less. Hence, compared with a configuration in which the upward-facing surfaces of the opposing plates 108*a* have an average surface roughness Ra of more than 1 μm, the heat radiated by the heating plates 114 is effectively reflected, and thus, an increase in the temperature of the chains 72 is prevented.

Furthermore, in the fixing device 100, compared with the configuration using the fixing device 600, skew of a sheet member P being transported with respect to the transport direction is prevented. Hence, creases in the sheet member P caused by the sheet member P being nipped between the heating roller 130 and the pressure roller 140 in a skewed state is prevented.

Furthermore, in the image forming apparatus 10, compared with the configuration using the fixing device 600, creases in the sheet member P is prevented. Hence, a decrease in the quality of an output image is prevented.

Second Exemplary Embodiment

An example of a fixing device and an example of an image forming apparatus according to a second exemplary embodiment of the present disclosure will be described with reference to FIGS. 11 and 12. The second exemplary embodiment will be described below, focusing on the difference from the first exemplary embodiment.

Figure 12:
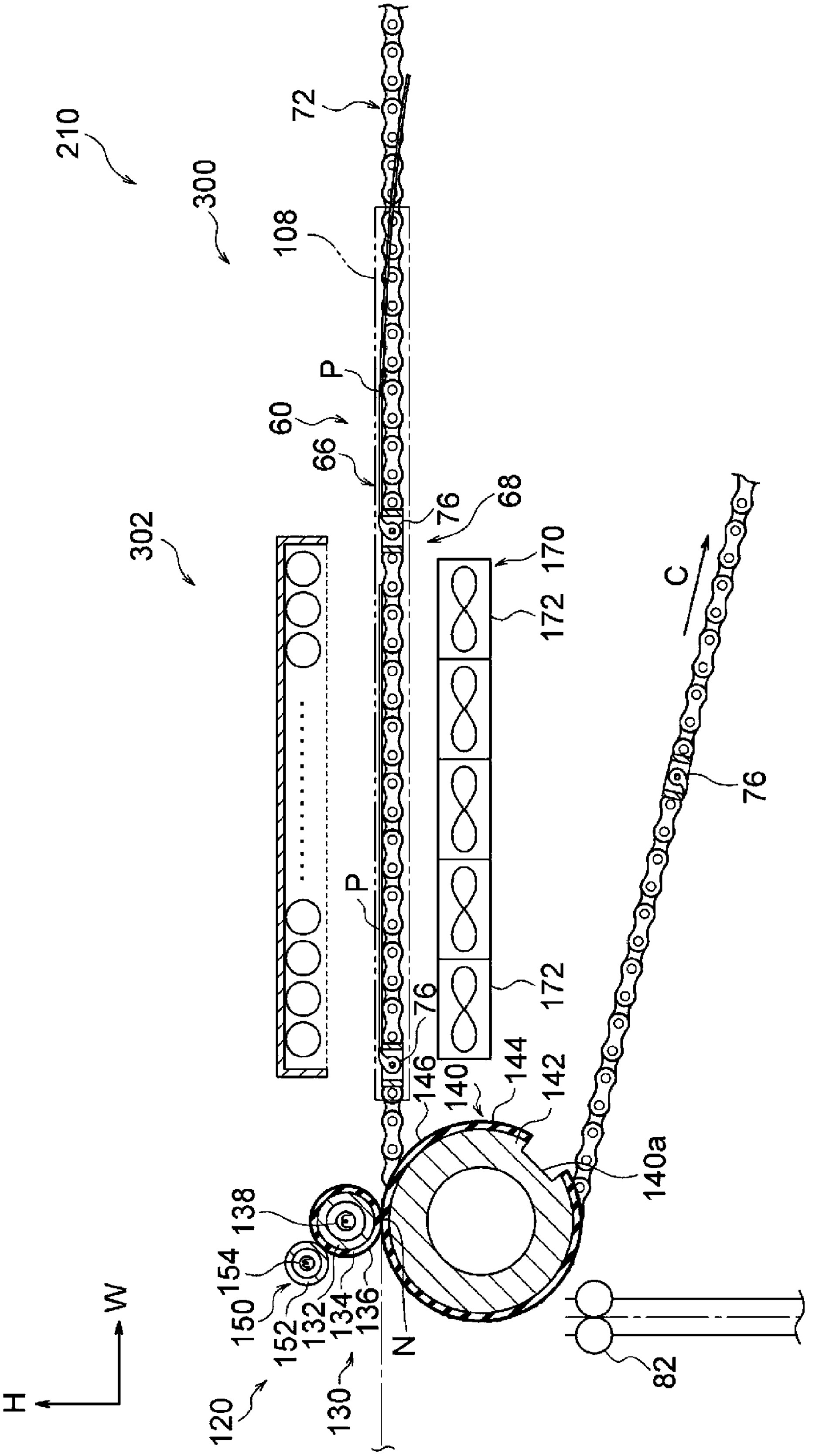
FIG. 12 is a side view of the fixing device according to the second exemplary embodiment of the present disclosure.

As shown in FIG. 12, a fixing device 300 of an image forming apparatus 210 according to the second exemplary embodiment includes a preheating part 302 that heats, in a non-contact manner, a sheet member P being transported, the chains 72, and the holding parts 68. The fixing device 300 also includes the heating part 120 that comes into contact with the sheet member P to apply heat and pressure, the blowing unit 170, and the heat shielding members 108 that block the heat radiated from the preheating part 302 and transferred to the chains 72.

Preheating Part 302

Figure 11:
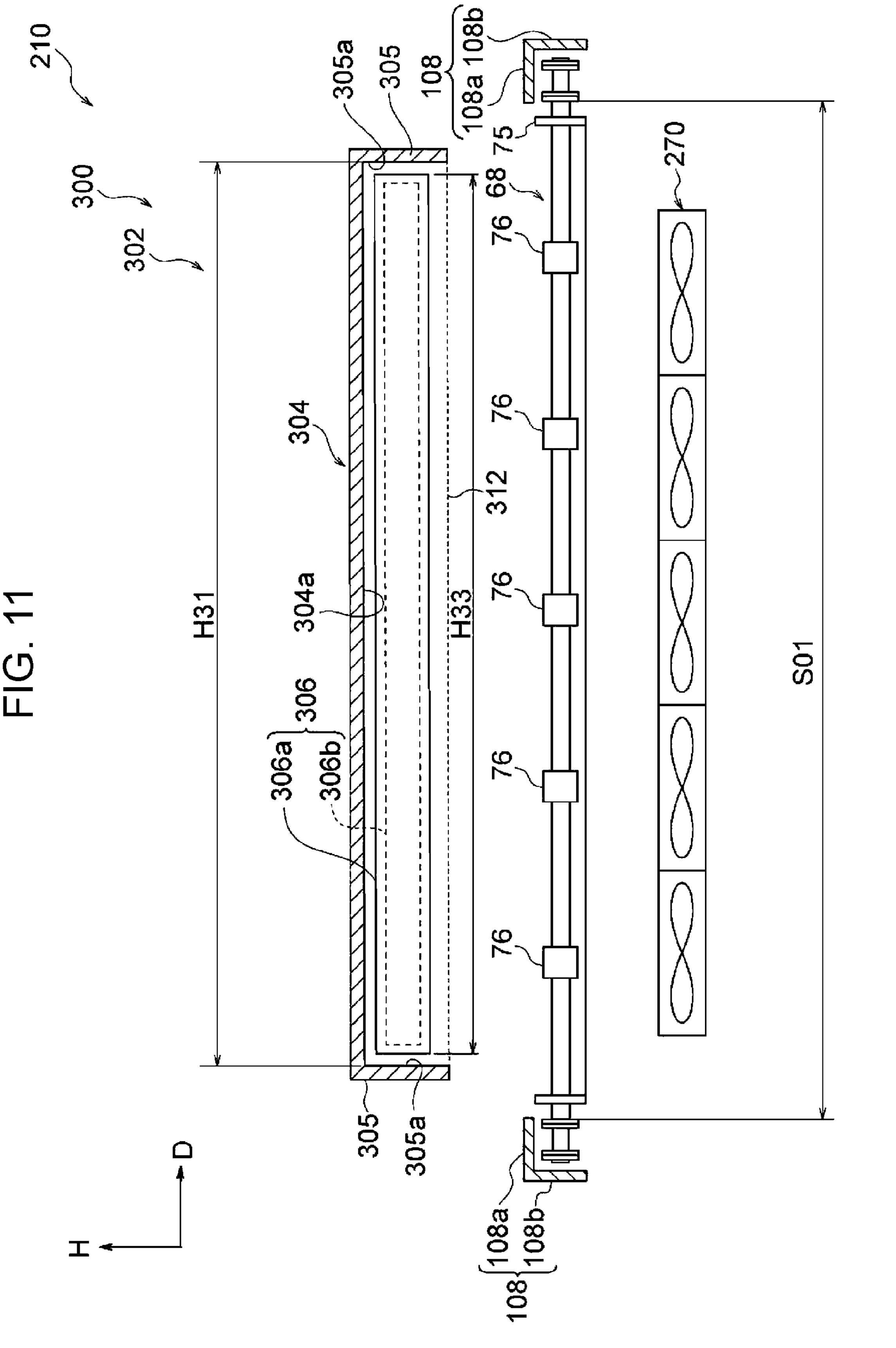
FIG. 11 is a front view of a fixing device according to a second exemplary embodiment of the present disclosure.

As shown in FIG. 11, the preheating part 302 includes a reflection member 304, multiple infrared heaters 306 (hereinbelow, "heaters 306"), and a wire screen 312.

The reflection member 304 is made of an aluminum plate in the shape of a shallow box that is open on the side facing a sheet member P being transported. The reflection member 304 has a reflection surface 304*a* that reflects infrared rays radiated by filaments 306*b* (described below) of the heaters 306.

In the depth direction of the apparatus, a reflection area (H31 in FIG. 11) in which the reflection surface 304*a* reflects the infrared rays is located within the space S01 between the chains 72.

The reflection member 304 has a pair of side plates 305 located on both sides of the heaters 306 in the depth direction of the apparatus. The lower edges of the side plates 305 are located below the heaters 306 in the top-bottom direction of the apparatus.

Furthermore, the pair of side plates 305 have opposing faces 305*a* that face each other. The pair of opposing faces 305*a* are disposed within the space S01 between the chains 72 in the depth direction of the apparatus. The opposing faces 305*a* are an example of side surfaces.

The heaters 306 are cylindrical infrared heaters and are located at a distance of, for example, 30 mm, in the top-bottom direction, from the leading end of a sheet member P being transported. Furthermore, as shown in FIG. 11, the heaters 306 include cylindrical silica tubes 306*a* and the filaments 306*b*, which are arranged in the silica tubes 306*a* and radiate infrared rays. The silica tubes 306*a* have black coatings on the surfaces. The silica tubes 306*a* are an example of the heating part.

An area in which the silica tubes 306*a* are arranged (H33 in FIG. 11) is located within the space S01 between the chains 72 in the depth direction of the apparatus.

Furthermore, as shown in FIG. 11, the wire screen 312 is fixed to the edge of the reflection member 304 with fixing members (not shown) to divide the inside of the reflection member 304 from the outside.

Effect

In the fixing device 300 shown in FIG. 11, the filaments 306*b* of the heaters 306 are energized. The silica tubes 306*a* are heated by absorbing the infrared rays radiated by the energized filaments 306*b* and release heat. The heated silica tubes 306*a* heat, in a non-contact manner from above, the sheet member P transported by the circulating chains 72. As a result of the sheet member P being heated, the toner constituting the toner image on the sheet member P is softened.

Other effects are the same as those in the first exemplary embodiment, except for the effect obtained by the presence of the heating plates 114.

Although specific exemplary embodiments of the present disclosure have been described in detail above, it is obvious to those skilled in the art that the present disclosure is not limited to the above-described exemplary embodiments, and various modifications, changes, improvements are possible within the scope of the present disclosure. For example, although not specifically described in the above-described exemplary embodiments, for example, other heating devices, such as a ceramic heater, a halogen heater, and heating wires, may be used as a heating part for heating the sheet member P.

In the first exemplary embodiment, the heating plates 114 are plate members having plate surfaces facing a sheet member P being transported. However, the heating plates 114 may be corrugated. In that case, the effect obtained by the plate surfaces facing a sheet member P being transported is not obtained.

Furthermore, although not specifically described in the above-described exemplary embodiments, the opposing faces 105*a* and 305*a* may reflect heat. This prevents a decrease in temperature in the reflection members 104 and 304, and the sheet member P being transported is effectively heated.

Furthermore, although the circulating parts have been the chains 72 in the above-described exemplary embodiments, the circulating parts only need to be endless, and thus, may be wires or the like.

In the first exemplary embodiment, although the heating plates 114 are located within the area H03 in the depth direction of the apparatus, the heating plates 114 do not need to be located within the area H03. However, in that case, the effect obtained by the heating plates 114 being located within the area H03 is not obtained.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A fixing device comprising:

a holding part that extends in a width direction of a recording medium being transported and that holds the recording medium;

a pair of circulating parts that are attached to both ends of the holding part and that circulate to transport the recording medium; and a heating member that heats the recording medium in a non-contact manner and that is located in a space between the pair of circulating parts in the width direction; and a reflection part that has a reflection area, parallel to a transport direction of the recording medium when under the heating member, that reflects the heat rays, that has side surfaces located on both sides of the heating member in the width direction and the heating member and the reflection area of the reflection part are disposed in this order from the side closer to the recording medium, wherein outermost portions of the heating member are disposed within the pair of circulating parts in the width direction, and outermost portions of the side surfaces are disposed between outermost portions of the heating member and innermost portions of circulating part in the width direction.

2. The fixing device according to claim 1, further comprising a radiation part that is disposed on the opposite side of the heating member from the circulating parts as viewed in the width direction and that radiates heat rays, wherein:

the heating member is a plate member having a plate surface facing the recording medium being transported, and the heating member releases heat by absorbing the heat rays radiated by the radiation part.

3. The fixing device according to claim 2, wherein:

the radiation part extends in the width direction, and the heating member is located within an area in which the radiation part is disposed.

4. The fixing device according to claim 3, further comprising heat shielding parts that face the circulating parts in an intersecting direction intersecting the width direction as viewed in a recording-medium transport direction and that are entirely located outside of an area in which the heating member is disposed in the width direction.

5. The fixing device according to claim 2, further comprising heat shielding parts that face the circulating parts in an intersecting direction intersecting the width direction as viewed in a recording-medium transport direction and that are entirely located outside of an area in which the heating member is disposed in the width direction.

6. The fixing device according to claim 1, further comprising heat shielding parts that face the circulating parts in an intersecting direction intersecting the width direction as viewed in a recording-medium transport direction and that are entirely located outside of an area in which the heating member is disposed in the width direction.

7. The fixing device according to claim 1, further comprising contact heating portions that are located downstream of the heating member in a recording-medium transport direction and that heat the recording medium while rotating against each other to transport the recording medium nipped therebetween.

8. An image forming apparatus comprising:

a forming unit that forms an image on a recording medium and is an electrophotographic image forming apparatus; and the fixing device according to claim 7 that fixes the image to the recording medium.

* * * * *